No. 876,339. PATENTED JAN. 14, 1908.
L. C. FARMER.
MEASURE.
APPLICATION FILED SEPT. 17, 1907.
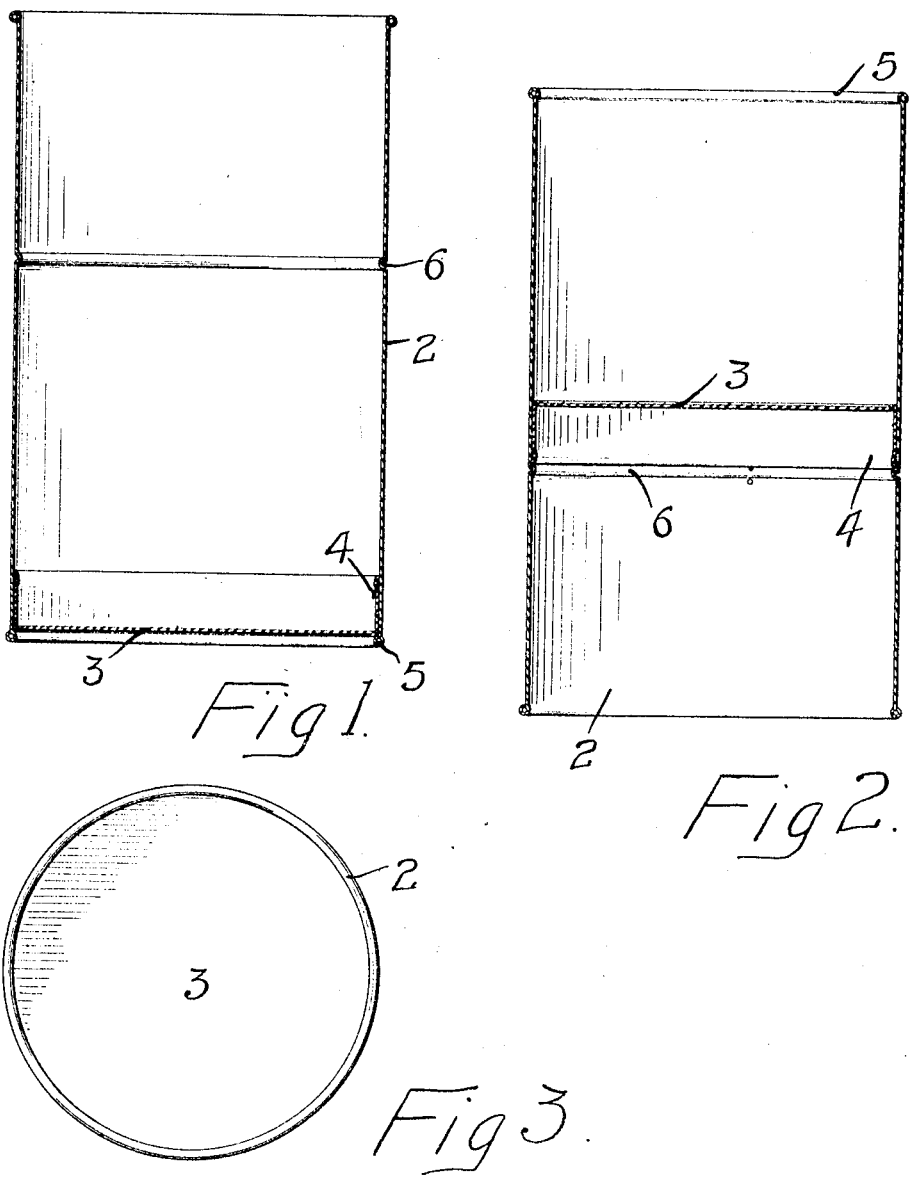

UNITED STATES PATENT OFFICE.

LUTHER C. FARMER, OF MINNEAPOLIS, MINNESOTA, ASSIGNOR OF ONE-HALF TO W. A. MATHER, OF MINNEAPOLIS, MINNESOTA.

MEASURE.

No. 876,339.　　　Specification of Letters Patent.　　　Patented Jan. 14, 1908.

Application filed September 17, 1907. Serial No. 393,406.

*To all whom it may concern:*

Be it known that I, LUTHER C. FARMER, of Minneapolis, Hennepin county, Minnesota, have invented certain new and useful Improvements in Measures, of which the following is a specification.

My invention relates to dry measures and the object of the invention is to provide a single receptacle which can be easily and quickly adapted for measures of different sizes.

The invention consists generally in providing a tubular body having open ends and a bottom arranged to slide therein, with means for limiting the movement of said bottom and thereby adapting one end of the device for a measure of one size and the other end of the device as a measure of another size.

In the accompanying drawings, forming part of this specification, Figure 1 is a vertical sectional view illustrating the device ready for use as a measure of a certain size, say one peck. Fig. 2 is a similar view showing the device inverted and adapted for use as a measure of another size, for instance one-half peck. Fig. 3 is a top view of the same.

In the drawing, 2 represents a sheet metal cylinder open at each end and provided with a bottom 3 that is adapted to slide back and forth within the cylinder, having preferably a flange 4 which acts as a guide and prevents the bottom plate from tilting and becoming lodged in the cylinder.

A bead 5 is provided at one end of the cylinder with which the plate contacts to form a measure of a certain size, say one peck, and an annular rib 6 is formed in the wall of the cylinder intermediate to its ends to engage the edge of the flange 4 when the cylinder is inverted, and limit the movement of the sliding bottom toward the other end of the cylinder and thereby adapt the device for use as a measure of a smaller size, for instance, one-half a peck. Obviously this same principle can be applied to any other size of measure, it being merely necessary to determine the proper position of the annular rib or bead 6 according to the diameter of the cylinder and the size of measure desired.

The measure may be made of any suitable material and in place of having the bead extending continuously around the cylinder, any suitable means may be employed for limiting the sliding movement of the bottom plate.

I claim as my invention:

1. A measure comprising a vessel open at both ends and provided with stops in its walls, one stop being located near one end of the vessel and the other stop intermediate to the ends of the vessel, and a bottom plate arranged to slide by gravity between said stops whereby when one end of the vessel is uppermost said bottom plate will slide automatically against one of the stops and adapt the vessel for use as a measure of a certain size and upon inverting the vessel the bottom will slide in a similar manner against the other stop and adapt the vessel for use as a measure of another size.

2. A measure comprising a cylinder open at both ends and provided at one end with a bead 5 forming a stop and at a point near the middle of the cylinder with an inwardly projecting rib 6 also forming a stop, a bottom plate 3 adapted to slide by gravity between said stops and having an annular flange 4 on one side forming a guide for said bottom plate and said plate being adapted to slide against the stop 5 when one end of the cylinder is turned uppermost and form with said cylinder a measure of a certain size and slide in the opposite direction until said flange engages the stop 6 when the cylinder is inverted and form a measure of another size, substantially as described.

In witness whereof, I have hereunto set my hand this 13th day of Sepetmber, 1907.

LUTHER C. FARMER.

Witnesses:
　RICHARD PAUL,
　JULIA B. BYINGTON.